United States Patent [19]

Suomala

[11] Patent Number: 4,932,007
[45] Date of Patent: Jun. 5, 1990

[54] FISH BEHAVIOR CONTROL SYSTEM

[75] Inventor: John Suomala, Hingham, Mass.

[73] Assignee: Underwater Acoustics Systems, Inc., Hingham, Mass.

[21] Appl. No.: 255,145

[22] Filed: Oct. 7, 1988

[51] Int. Cl.$^5$ .............................................. G10K 1/00
[52] U.S. Cl. ..................................... 367/139; 43/171
[58] Field of Search .................... 367/139, 87, 111; 119/3; 116/22 A; 340/384 R, 384 E; 43/17.1, 124

[56] References Cited

U.S. PATENT DOCUMENTS

| | | | |
|---|---|---|---|
| 3,307,285 | 3/1967 | Wells | 43/4.5 |
| 3,317,889 | 5/1967 | Barrand . | |
| 3,414,873 | 12/1968 | Richard et al. | 43/17.1 X |
| 3,524,276 | 1/1968 | Thomas et al. | 43/4.5 |
| 3,538,493 | 11/1970 | Pipkin et al. . | |
| 3,802,109 | 4/1974 | Stein | 43/17.1 |
| 3,872,472 | 3/1975 | Moschgat | 340/384 E |
| 4,001,817 | 1/1977 | Squires | 340/384 E |
| 4,186,387 | 1/1980 | Moschgat | 340/384 E |
| 4,191,175 | 3/1980 | Nagle | 600/27 |
| 4,556,963 | 12/1985 | Hugus et al. | 367/143 |
| 4,563,759 | 1/1986 | Hayakawa | 340/384 E X |
| 4,646,276 | 2/1987 | Kowalewski et al. | 367/139 |
| 4,658,386 | 4/1987 | Morris | 367/139 |

Primary Examiner—Thomas H. Tarcza
Assistant Examiner—Tod Swann
Attorney, Agent, or Firm—Nutter, McClennen & Fish

[57] ABSTRACT

A device for modifying the behavior of fish, causing them to swim along a desired path, projects sequences of sound into the water, resulting in sound wave patterns which direct the fish along the desired path. The device includes a fish detector, which detects the monitors the activities of fish, an array of sound projectors and a controller. When fish are detected the controller generates sequences of signals which are applied to the projector array. The projectors project corresponding sounds into the water, producing the sound wave patterns. The detector monitors the activities of the fish and the controller, if necessary, adjusts the sound sequences until the fish are directed along the path. When the detector no longer detects any fish, the controller stops applying signals to the projector array, preventing approaching fish from habituating to the projected sounds.

10 Claims, 2 Drawing Sheets

FISH BEHAVIOR CONTROL SYSTEM

FIELD OF INVENTION

The invention relates to modifying the behavior of fish and more particularly modifying their behavior using various sounds.

BACKGROUND OF THE INvENTION

Hydro-electric power plants are built on or adjacent to rivers. The power plants include turbines which are placed in the flow of the river. The moving water causes the turbines to rotate, producing rotational energy, and this energy is then converted to electricity. The power plant turbines typically utilize as much of the flowing water as possible. Often, diversion canals, also referred to as sluice ways, are built along the sides of the power plant to allow debris to be diverted around the turbines. The canals are relatively narrow, minimizing the amount of water diverted from the turbines.

Many, if not most, of the rivers on which hydro-electric power plants are built are inhabited by various varieties of fish. The fish, which regularly swim up and down the river to breed and/or feed, must swim past the power plants. For example, fish living downriver from a power plant may travel upriver to lay eggs. Thereafter the adult fish, as well as the young fish hatching from the eggs, follow their instinctual calling and swim back downriver to feed.

Many fish do not survive the downriver journey because they swim into the power plant turbines and are killed. Observers have found that the fish hesitantly approach the turbine intakes, and after evidently sensing no danger, swim directly into the turbines to their death or fatal injury. A mechanism to alter the behavior of the fish, keeping them from the turbines, without affecting the flow of water is desirable. Such mechanisms may also be used by nuclear power plants or other thermal power plants to deter fish from cooling water intakes.

After much study of fish behavior and particularly fish "sensing" abilities, scientists have found that fish possess highly developed acoustic sensory systems. These systems include tiny "hair cells" which are connected to lateral-line and inner-ear sense organs. The hair cells move in response to the pressure, direction and velocity of sound waves propagating from underwater sound sources and the lateral-line and inner-ear sense organs "interpret" the hair cell movements. For a more detailed discussion of the fish acoustic sensory system, see Kalmijn, Ad.J. (1985) "Hydrodynamic and Acoustic Field Detection" in *Sensory Biology of Aquatic Animals,* Jelle Atema et. al. (editors), Springer-Verlag, New York, pages 83-129.

Basically, the fish sense the movement of the water associated with the sound waves, sensing what can be characterized as the frequency, amplitude and direction of the sound waves. Certain sounds, that is, certain sound wave patterns, are associated with danger, while other sound wave patterns identify nearby prey or are used for communication. For example, observers have found that the sound waves associated with a series of fish tail-flaps direct a school of fish to make a turn. Thus fish schools have been observed turning in unison following a series of tail-flaps.

Sound generating devices producing loud noises, and corresponding large sound waves, have been used in the past to scare fish away from particular areas. For example, loud sounds have been used to scare sharks from an area making it safe for divers, as shown in Barrand U.S. Pat. 3,317,889. This works well to rid an area of fish for a short period of time. However, if the fish are repeatedly subjected to the same sound, or if the sound is continuous, the fish will sense that there is no danger associated with it. Thus the fish will eventually habituate to the sound and no longer scatter.

Scaring and scattering fish which have strong instinctual yearnings to swim downstream will not work to keep the fish out of the turbines. The fish will eventually sense there is no danger associated with the sound and continue their downstream journey past the sound source and into the turbines. Furthermore, it has been observed that fish typically travel the same routes downstream, for example, swimming with the current or along the shore. Thus using loud noises to simply scatter the fish will not significantly alter the behavior of the fish and the fish will not be kept from the turbines for long. Instead, a mechanism to modify fish behavior, directing the fish to swim around the turbine intakes, is desirable.

SUMMARY OF THE INvENTION

The invention is a device for modifying the behavior of fish by projecting sequences of sound into the water. The sounds create sound wave patterns which direct the fish to swim along a desired path.

In brief summary, the device, after detecting approaching fish, generates and projects sequences of sounds designed to direct the fish to swim around a dangerous object following a safe path. The device then monitors the activities of the fish. If the fish are not swimming along the desired path the sound sequences are varied until the fish appropriately respond. The device may generate and project several sound sequences designed to direct various species of fish, each responding to different sounds, along the path. Once the detected fish are re-routed the device stops projecting, preventing approaching fish from habituating to the sounds. When fish are again detected near the dangerous object, the device generates and projects sounds to direct them safely around the object.

BRIEF DESCRIPTION OF THE DRAWINGS

For a more complete understanding of the features, advantages, and objects of the invention, reference should be made to the following detailed description and the accompanying drawings, in which.

DETAILED DESCRIPTION

Figure 1:
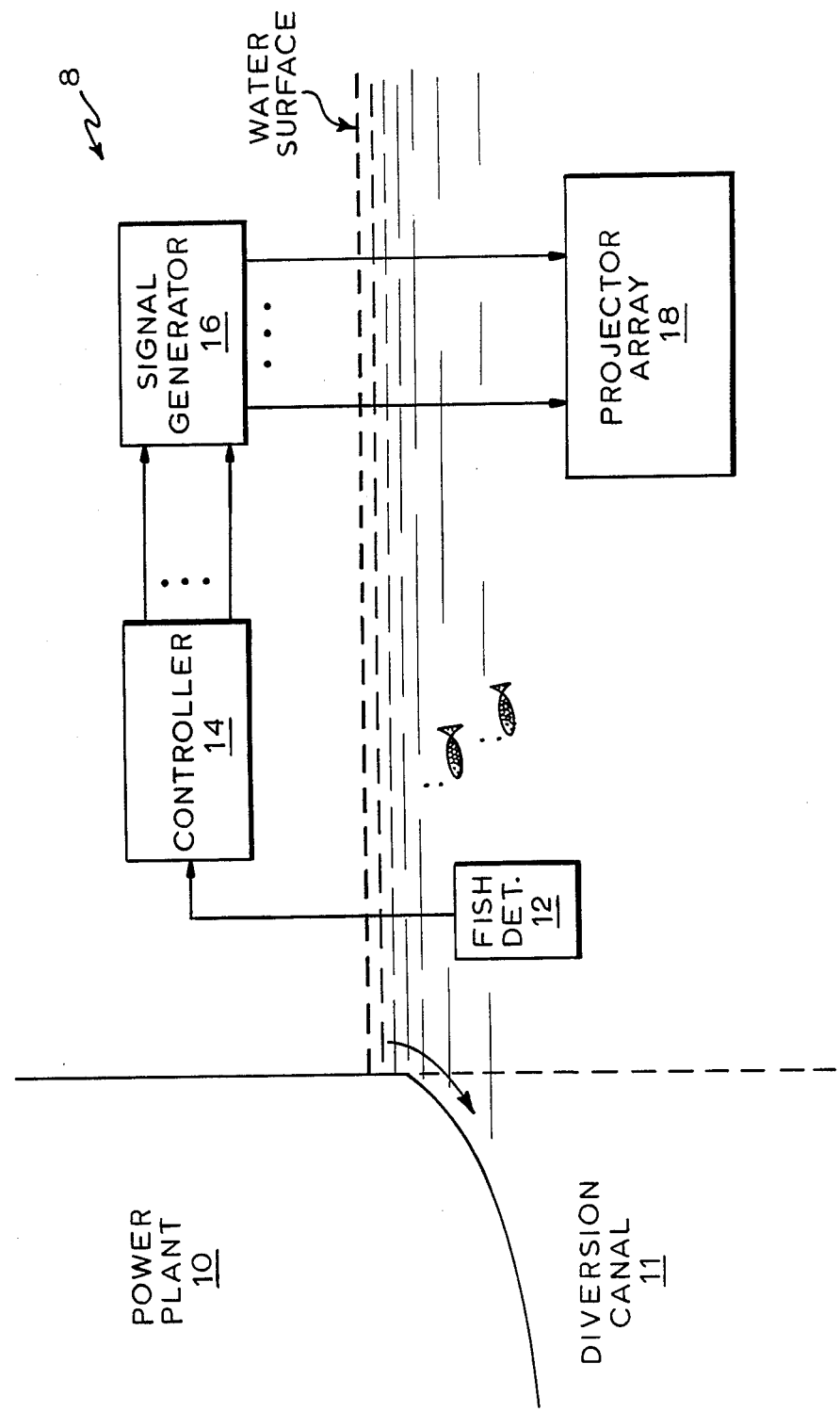
FIG. 1 is an illustration of a fish behavior modification device.

With reference to FIG. 1, a fish behavior modification device 8 includes a fish detector 12, a controller 14, a signature generator 16 and a projector array 18. The fish behavior modification device 8 located in close proximity to a hydro-electric power plant 10, uses sounds, and thus the associated sound waves, produced by the projector array 18 to divert the path of the fish around the power plant 10 and into a diversion canal 11. The fish then swim through the canal 11, or are swept into the canal 11 by the river current, avoiding the power plant turbines.

As fish approach the power plant 10, the fish detector 12 sends signals to the controller 14 indicating the presence of the fish. The detector signals also contain information concerning the number of fish detected. When the signals indicate that the number of fish detected exceeds a predetermined number, the controller 14 activates the signature generator 16. The signature generator 16 then activates the projector array 18 to produce sounds, and thus sound waves. The sounds, which may follow a predetermined sequence, are selected such that they will cause the fish to modify their behavior, directing them toward the diversion canal 11. For example, sounds which produce sound waves emulating fish tail-flaps may be used to turn the fish in a desired direction.

The fish detector 12 continues to send signals to the controller 14 indicating the activities of the fish. If the fishes' behavior is not appropriately modified by the projected sounds, the controller 14 alters the sound sequence until the fish appropriately respond. Different species of fish respond differently to the sounds and thus the controller 14 may sequence the signature generator 16 through a number of predetermined sound sequences designed appropriately to modify the behavior of the various fish. If the predetermined sequences do not produce the desired effect on the fish, the controller 14 alters the sound sequences until the desired behavior is detected. Once an appropriate sound sequence is found, the controller 14 stores the sequence for future use.

After the detected fish are channeled through the canal 11, and the detector no longer detects fish exceeding the predetermined minimum number, the controller ends the projected sound sequence. Thus the fish approaching the turbines which are out of the detectors range, and therefore out not in danger of swimming into the turbines, are prevented from habituating to the sounds. The projectors 18A remain silent until the detector 12 again detects a predetermined number of fish.

Figure 2:
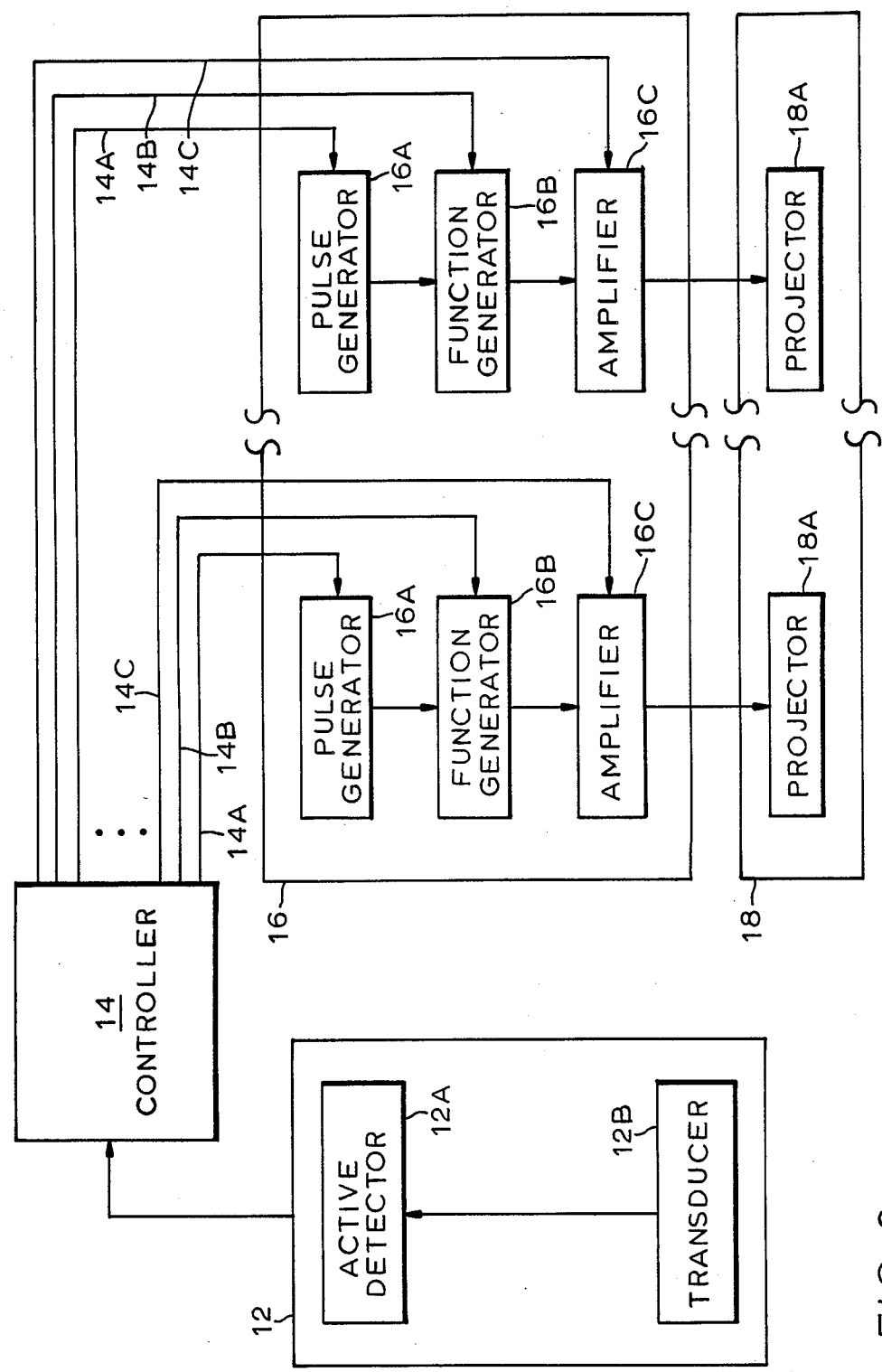
FIG. 2 is a detailed diagram of the fish behavior modification device shown in FIG. 1.

FIG. 2 is a detailed diagram of the fish behavior modification device 8. The fish detector 12 is an active sensor, for example, a SONAR device such as an echo sounder or an echo ranger of conventional design. In the preferred embodiment the detector is an echo sounder consisting of an active detector 12A and a transducer 12B. The detector 12, through transducer 12B, sends a pressure wave with a known frequency, amplitude and duration into the water in the horizontal direction. The pressure wave thus propagates from the transducer 12B most strongly along the horizontal axis and radiates outward from that axis in a known pattern. When objects are encountered, for example, fish or air bubbles, portions of the propagating pressure wave are reflected back to the transducer 12B. The amplitude, phase, frequency pattern and time delay of the reflected signals can then be used to calculate the location and size of the objects.

The transducer 12B converts the reflected waves to electrical signals of corresponding amplitude, phase, and frequency patterns and applies them to the active detector 12A. The active detector 12A then processes the signals and applies them to the controller 14. The controller 14 further processes the signals from the active detector 12A and interprets the signals to determine if the detected objects are fish. If the objects are fish, the controller further calculates approximately how many fish are approaching and their various locations.

When the number of fish exceeds a predetermined minimum, the controller 14 activates the signature generator 16. The signature generator 16 includes pulse generators 16A, function generators 16B and amplifiers 16C of conventional design, each of which is individually operated by the controller 14 over lines 14A, 14B and 14C, respectively. The controller 14 directs the various generators and amplifiers 16A-C to produce signals of desired frequency, phase, amplitude and duration. These signals are applied to the various projectors 18A, which in the preferred embodiment are electro-acoustical underwater loudspeakers of conventional design. In response, the projectors 18A produce corresponding sounds, and thus sound waves. The term "sound" used below includes the corresponding sound waves.

The projected sounds disturb the hair cells of the detected fish and are thus sensed by the fish. The sounds which the fish sense are the combination of the various sounds produced by the individual projectors 18A. For example, if one projector produces a square wave with a frequency $f_1$ and another projector produces various pulses at non-regular intervals, the fish sense the underlying square wave with various interference patterns caused by the non-regular pulses. Alternatively, the projectors 18A may project tonal sounds, that is, sinusoidal oscillations at various frequencies, combining to form harmonics and thus providing frequency difference combinations. For example, a projector may produce a tone with a frequency $f_1 = 1000$ HZ and another projector may produce a tone with a frequency $f_2 1500$ HZ with resulting sounds having difference frequencies $f_1 + f_2 = 2500$ HZ and $f_1 - f_2 = 500$ HZ. The sounds may be interpreted by the fish as predators swimming nearby, causing the fish to change course to avoid an attack.

The array of projectors 18A, each individually controlled by the controller 14, is capable of producing sounds in virtually any sound wave shape covering the full auditory sensing range of fish, which is approximately 50 HZ to 5000 HZ. The projector array 18 is thus capable of imitating the sounds which the fish associate with predators, with communications from "friendly" fish, etc., as discussed in Blaxter, J.H.S. (1985) "Sensory Ecology of Fish" in *Sensory Biology of Aquatic Animals*, Jelle Atema et al. (editors) Springer-Verlag, New York, pages 203–228, which is incorporated herein by reference. The apparent direction of the sound may also be controlled using the multiple projectors 18A by selectively amplifying the sounds produced by certain projectors 18A.

The number of projectors 18A and corresponding generators and amplifiers 16A-C required to control the fish depends on the location of the device 8. A device 8 situated in a wide-open area may require more projectors 18A than a device 8 situated in a smaller, closed-in area.

The controller 14 may have stored several sound generating routines which have proven effective in modifying the behavior of the fish. The controller 14 selects one such routine, tries it, and if the routine is not then effective tries another. The controller may thus try any number of stored routines until it finds one that is suitable. Each routine tried will presumably have some effect on the fish, at least keeping them away from the turbines. However, the noneffective routines will not appropriately direct the fish to the diversion canal 11 (FIG. 1).

If the stored routines are not effective because, for example, the species of fish approaching the power plant is one that has not previously been encountered by the fish behavior modification device 8, the controller 14 may randomly vary, or vary in a predetermined manner, the frequency, phase, and/or amplitude of any number of signals applied to the array of projectors 18. The controller 14 continues to vary the signals until an effective routine is found. The effective routine may then be stored in the controller 14 for future use.

Once the number of detected fish is reduced to a predetermined minimum, the controller 14 stops the sound sequence, preventing approaching fish from habituating to the sounds. Thereafter, when the number of fish detected exceeds the predetermined minimum, the controller 14 activates the signature generator 16 and the sound sequences are again projected.

It will be appreciated by those skilled in the art that information relating the species of fish currently approaching the modification device 8, for example, season of the year, water temperature, etc., may be stored in the controller 14 along with the effective routine. The controller 14 may then first try the routines which have previously proven effective during the same season, or at approximately the same water temperature, to divert approaching fish. The device 8 may thus adapt to different environments and/or different species of fish.

It will be further appreciated by those skilled in the art that the controller 14 could activate the signature generator 16 if, for example, the approaching fish are larger or smaller than a predetermined size, or if the fish exceed or fall below any other detectable measurement, regardless of the number of approaching fish. The fish behavior modification device 8 could then be used primarily to divert these fish from danger.

The fish behavior modification device 8 may also be used to attract fish to a particular location. The device 8 may be located near the diversion canal 11 (FIG. 1) and produce sound sequences attracting the fish to the canal 11. The fish will then swim toward the device 8, and thus the canal 11, and either be swept into the canal 11 by the current or swim into the canal 11 as directed by the device 8.

The fish behavior modification device 8 reacts to approaching fish, diverting them around dangerous objects and into a safe route. Thus the device 8 is not continuously projecting and the fish will not habituate to the sounds. The device 8 is capable of generating sounds covering the full range of fish auditory sensing capabilities, and thus the device 8 is not limited to use with any particular species of fish. Furthermore, the device is readily adaptable to different environments and different fish, and thus it may be used without substantial modification in many locations.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. The method of modifying the behavior of fish comprising the steps of:
   A. detecting approaching fish;
   B. generating sounds and projecting said sounds into the water;
   C. monitoring the response of the fish to said projected sounds;
   D. i. if the fish respond as desired, continuing to project the same sounds for a predetermined period of time, or ii. if the fish do not respond as desired, altering the sounds projected until the fish do so respond and projecting these sounds for a predetermined period of time; and
   E. repeating steps A–D.

2. The method of claim 1, wherein said generating step further includes generating sounds following a predetermined sequence.

3. The method of claim 1, wherein said generating step further includes generating sounds in a random sequence.

4. A fish behavior modifier device comprising:
   A. a fish detector for producing signals corresponding to:
      i. the presence of fish, and
      ii. the movement of the detected fish;
   B. a controller connected to generate control signals in response to said detector signals; and
   C. a sound generator connected to generate sounds in response to said control signals and project said sounds into the water, said sounds directing the fish to modify their behavior and swim along a desired route;
   said controller automatically and selectively (1) varying the generated control signals if after a predetermined time said fish detector detects that the fish are not moving along the desired route, said varied control signals being selected to direct the fish to move along the desired route, or (2) continuing to generate the same control signals for a predetermined time if the fish detector detects that the fish are moving along the desired route.

5. The device of claim 4, wherein said sound generator comprises an array of underwater sound projectors each of which is individually controlled by said controller.

6. The device of claim 4, wherein each of said projectors in said array is operated by:
   A. a pulse generator for generating pulses at a frequency directed by said control signals;
   B. a function generator connected to generate signals corresponding to a desired function at the directed frequency; and
   C. an amplifier connected to amplify the signals generated by said function generator;
   said pulse generator, function generator, and amplifier, each being individually controlled by said controller in order to produce at any given time sounds of a desired frequency, phase, amplitude and duration.

7. The fish behavior modifier device of claim 4, wherein said controller stores the control signals corresponding to a directed fish movement along the desired route, said controller thereafter accessing the stored control signals and applying them to said sound generator to direct later detected fish along the desired route.

8. The device of claim 4, wherein said controller further applies to said sound generator one or more predetermined sequences of control signals.

9. The fish behavior modifier device of claim 4, wherein said controller continues to apply the control signals corresponding to a directed fish movement to said sound generator as long as the detected fish are moving along the desired route, said controller refraining from applying the signals once the detected fish have moved a predetermined distance along the route.

10. The fish behavior modifier device of claim 4, wherein said controller further applies to said sound generator random sequences of control signals.

* * * * *